No. 656,745. Patented Aug. 28, 1900.
L. L. MIVELAZ.
APPARATUS FOR MOLDING AND CUTTING BUTTER.
(Application filed Dec. 2, 1899.)
(No Model.) 2 Sheets—Sheet 1.
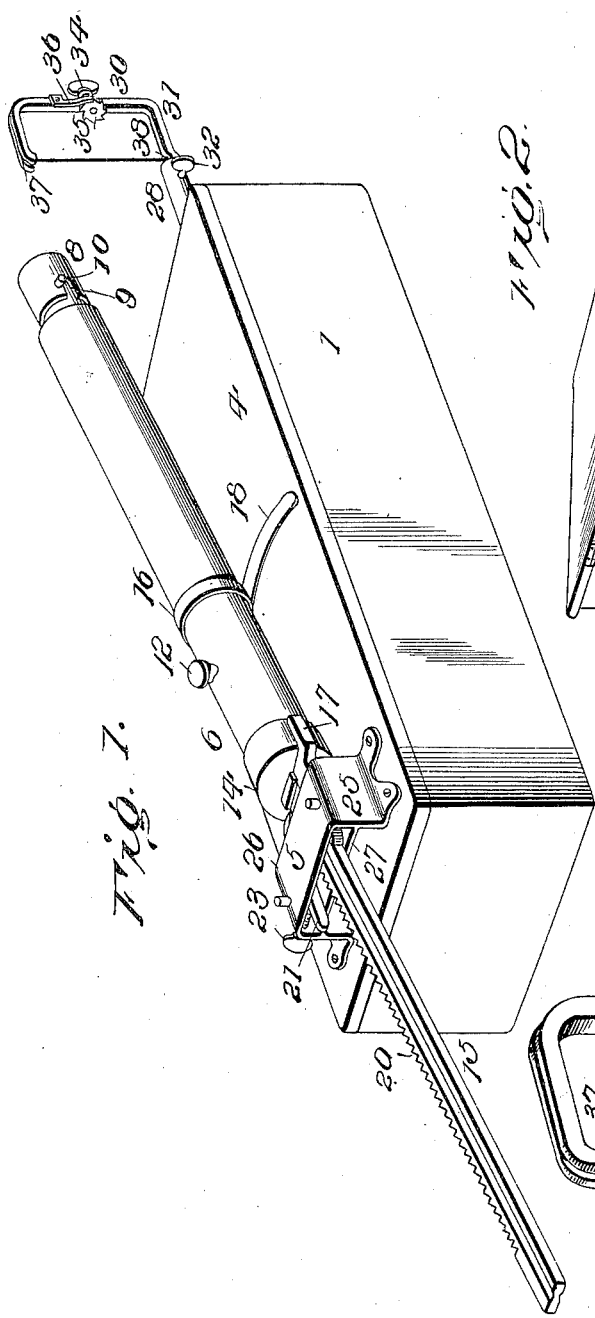
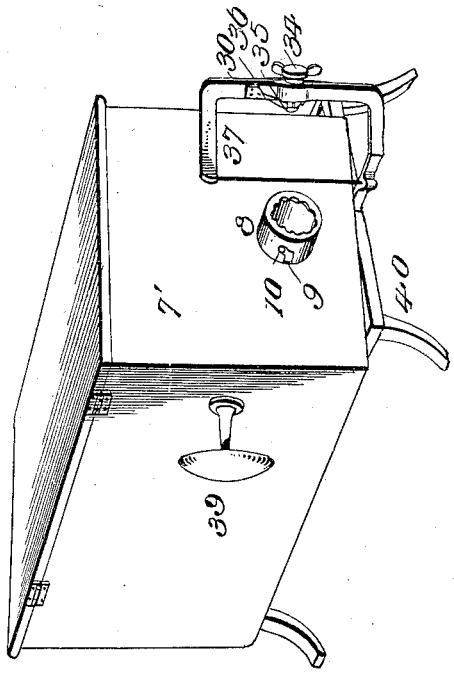
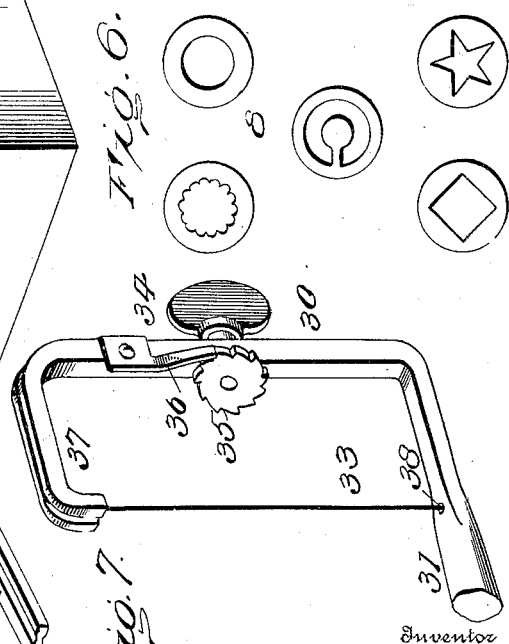
Witnesses
Inventor
Louis L. Mivelaz
by R. S. & A. B. Lacey his Attorneys

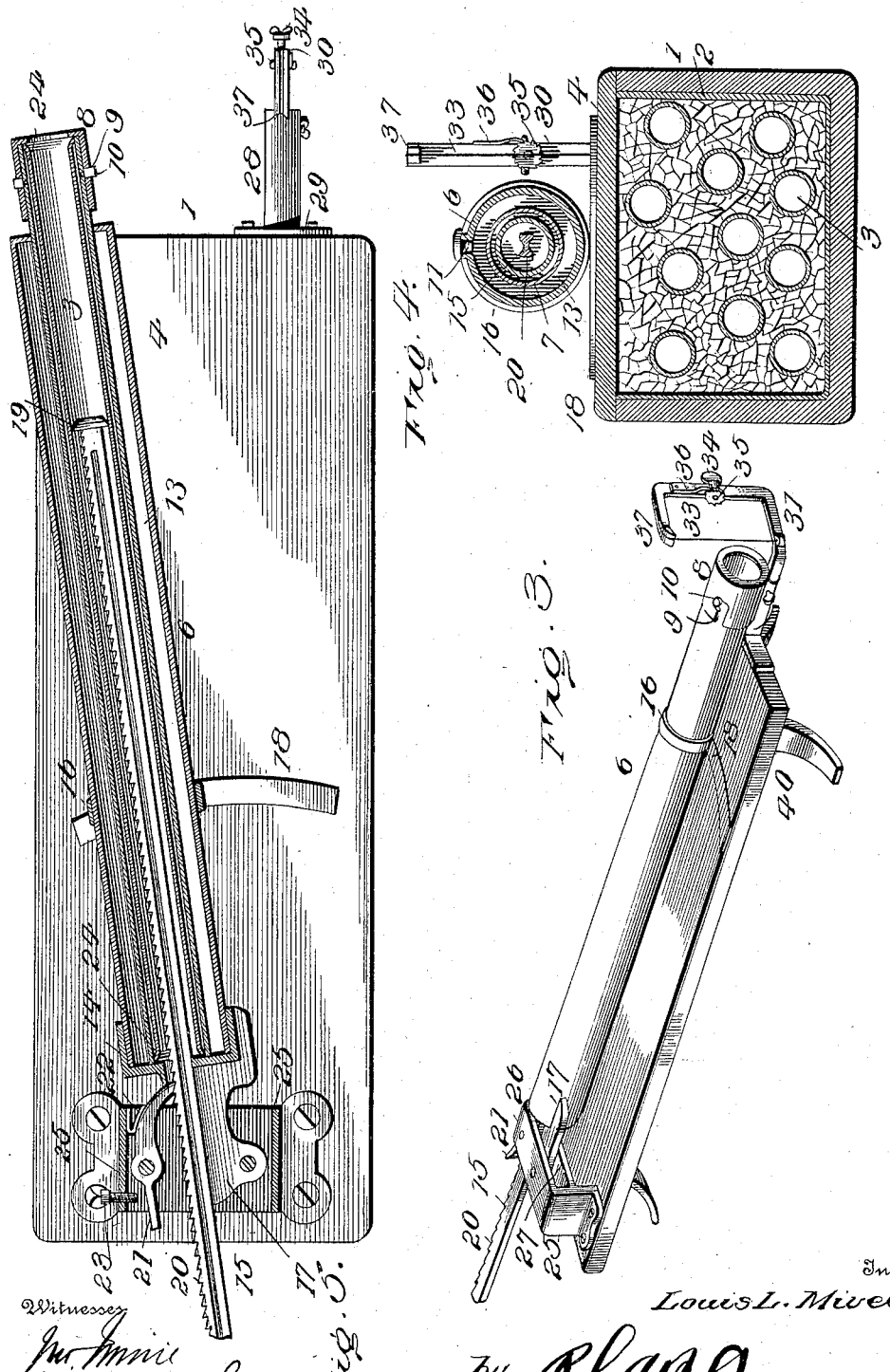

UNITED STATES PATENT OFFICE.

LOUIS L. MIVELAZ, OF MEMPHIS, TENNESSEE.

APPARATUS FOR MOLDING AND CUTTING BUTTER.

SPECIFICATION forming part of Letters Patent No. 656,745, dated August 28, 1900.

Application filed December 2, 1899. Serial No. 738,990. (No model.)

*To all whom it may concern:*

Be it known that I, LOUIS L. MIVELAZ, a citizen of the United States, residing at Memphis, in the county of Shelby and State of Tennessee, have invented certain new and useful Improvements in Apparatus for Molding and Cutting Butter; and I do hereby declare the following to be a full, clear, and exact description of the invention, such as will enable others skilled in the art to which it appertains to make and use the same.

In apparatus for shaping and cutting butter into prints or pads for individual use at table it has been the general custom to let the prints or pads fall into cold water when cut and to keep the tubes containing the butter to be molded and subdivided in water sufficiently cool to prevent softening of the butter. It has been found that the prints suffer a loss of color and flavor, which is entirely objectionable. Moreover, it is not possible to cut the prints as required, particularly if the atmosphere be warm and the demands are at comparatively-long intervals apart, because the butter in the tube will soften and cannot be worked.

This invention has for one object the provision in a single organized sturcture of a cooler, a molder or former, means for forcing a determinate quantity of butter through the molder, and a cutter, the parts being compactly arranged and disposed so as to admit of adjustment, a replenishing of the cylinder, and storing of the charged tubes in the cooler.

A further purpose is to dispense entirely with cold water to receive the prints, to preserve the color and sweetness of the butter, and to enable the prints to be cut as required, whether the demand be at long intervals or rapid and constant.

The invention aims to provide also for a variation of the feed of the butter through the shaper or molder without modifying the amplitude of movement of the tube, thereby enabling prints of varying thickness to be cut.

The invention also aims to provide a machine of the character and for the purpose aforesaid which can be used horizontally, vertically, or in any convenient position, according to the location, surroundings, and allotted room space, and which will be compact and capable of operation in a comparatively-small space.

The invention contemplates various other advantages, some of which will suggest themselves as its nature is unfolded and grasped; and it consists of the novel features, details of construction, and combinations of parts, which hereinafter will be more fully described and claimed.

While the drawings illustrate an embodiment of the invention in its present form, it is to be understood that in adapting it for special purposes many changes in the form, proportion, and minor details of construction may be resorted to without departing from or sacrificing any of the advantages of the invention.

Referring to the drawings, in which corresponding and like parts are indicated in all the views by the same reference characters and designated in a similar manner in the following description, Figure 1 is a perspective view of a machine specially designed for attaining the objects of this invention. Fig. 2 is a similar view of a modification. Fig. 3 is a perspective view of a further modification. Fig. 4 is a cross-section of Fig. 1 in front of the segment wear-plate and looking to the rear. Fig. 5 is a horizontal section of the cylinder, butter-tube, molding-cap, and frame supporting the feed-pawl and rear end of the cylinder, showing the disposition of the parts and the feeding mechanism. Fig. 6 is a detail view of some of the many designs of formers or molds for shaping the butter prints or pads. Fig. 7 is a detail view of the cutter.

The cylinder, butter-tube, plunger, feeding mechanism, and cutter are the same in all forms and will be described at length hereinafter. These parts may be mounted on a stand or a box, as desired.

As shown in Figs. 1 and 4, a box is the support and constitutes a cooler for the extra butter-tubes. This box 1 may be constructed of any material and have any desired shape and dimensions, according to the capacity of the machine, and is preferably a wooden structure metal-lined, the metal lining being removable and constituting a receptacle 2, in which is placed the ice or other cooling agent, and the tubes 3, filled with butter. The open side of the box is closed by a cover 4, to which the operating parts are attached, said cover being hinged at one edge to a side of the box, so as to be opened and admit of ready access to the box for placing the tubes 3 therein or removing them therefrom when required or for any purpose. A frame 5 is secured to the top side of the cover at one end and is of bracket-like formation, its upper part being a box-loop and its lower portion appearing as feet, which are apertured to receive the fastenings by means of which the frame is secured to the cover. The cylinder 6 for receiving the tube containing the butter has pivotal connection at one end with the frame 5 and is adapted to oscillate or swing upon the support or cover 4. This cylinder is jacketed, and the latter may be a box 7', as shown in Fig. 2, or a tube 7, concentric with the cylinder and joined at its ends thereto, the space between the cylinder and its jacket serving for the reception of a cooling agent. The cylinder 6 projects a short distance beyond the extremity of the jacket and is adapted to have a former or mold 8 detachably fitted thereto, said former or mold being constructed after the manner of a cap and applied to the projecting end of the cylinder 6 by a slip-joint. The rim or body portion of the former or mold is provided with one or more L-shaped slots 9 to coöperate with a lug 10, projecting from the side of the cylinder 6, whereby the mold is secured positively to the cylinder by a bayonet-joint. An opening is provided in the top side of the tube 7, and a collar or flange 11 projects therefrom and is threaded to receive a plug or cap 12, by means of which the said opening is closed. When the closure 12 is removed, a cooling agent, such as ice-water, may be supplied to the space 13 formed between the concentric parts 6 and 7, thereby keeping the butter in the tube within the cylinder cool and in prime condition. A cap 14 is applied to the inner or pivotal end of the cylinder and is centrally apertured, the latter being of angular formation corresponding with the cross-sectional outline of the plunger-rod 15, which is adapted to operate therethrough. An arm 17 projects outwardly from the cap 14 in line with the cylinder and to one side of the opening through which the plunger-rod 15 works and is pivotally connected with a terminal portion of the frame 5, said arm entering the space formed between the upper and lower plates of the upper portion of said frame. A band 16 encircles the cylinder a short distance from its pivotal end and is adapted to travel upon a segmental wear-plate 18, applied to the cover 4, these parts receiving the wear incident to the oscillatory movements of the cylinder when the device is in service.

The plunger 19 is of a size to operate freely in the butter-tube 3, and its forward portion is slightly beveled to admit of it entering the tube 3 when placing the parts in position. The plunger-rod 15 works through the opening of the cap 14 and through the space formed between the upper and lower plates of the guide portion of the frame 5 and has an edge portion toothed, as shown at 20. A pawl 21 is located adjacent to the toothed side of the plunger-rod 15 and is pivoted intermediate of its ends to the frame 5 and is located in the box-looped portion thereof. A spring 22 normally holds the pawl in engagement with the teeth 20. A set-screw 23 is let into a threaded opening in an end portion of the frame 5 and bears against the outer end of the pawl 21 and fixes its position with reference to the teeth 20, whereby the feed of the plunger is adapted to be varied without changing the amplitude of movement of the cylinder. As the cylinder is oscillated the pawl rides upon the teeth 20 and engages positively with a tooth and causes a forward movement of the plunger and a corresponding expulsion of the butter. By a proper adjustment of the set-screw 23 the position of the pawl can be fixed so as to cause it to ride upon only one or any desired number of the teeth 20 within the range of the movement of the cylinder, thereby feeding the plunger forward a greater or less distance. If the pawl 21 were unrestricted, its engaging end would ride upon the teeth 20 when swinging the cylinder in one direction until it reached the limit of its movement, and upon swinging the cylinder back the pawl would engage with the last tooth and cause a steady advance of the plunger until the cylinder reached the limit of its movement in the opposite direction. By setting the screw 23 the pawl may be limited so as to ride upon only one or two teeth of the plunger-rod, the latter moving away from the engaging end of the pawl in the continued swing of the cylinder in the same direction after the pawl has reached the limit of its movement, determined by contact of its end with the set-screw 23. When swinging the cylinder in the reverse direction, it will move a given distance before contact of the pawl with the teeth 20, and as the cylinder finishes its return movement the last tooth to ride upon the pawl will be engaged thereby and the plunger moved forward a distance corresponding to the length of the tooth or number of teeth riding upon the pawl in the outward swing of the cylinder. It will thus be seen that the feed of the plunger can be regulated by the set-screw 23, irrespective of the amplitude of movement of the cylinder, thereby admitting of the prints or pads of butter being of any required thickness.

The tubes 3 are charged or filled with butter and may be placed in the receptacle or refrigerator 1 along with ice or other cooling agent, or they may be conveniently stored or filled as desired, and when it is required to place one in position the former or mold is removed from the outer end of the cylinder 6 or inner tube thereof and the tube 3 is slipped into position, after which the former or mold is replaced. The terminal portions of the tubes 3 are outwardly flared, as shown at 24, to direct the plunger therein when placing the tube within the cylinder, and these flared terminals also serve to centralize the tube 3 within the cylinder, the external diameter of the said tubes 3 being slightly less than the internal diameter of the cylinder.

The molds or formers 18 for shaping the butter consist of caps which are fitted upon the outer end of the cylinder or the projecting portion of the tube 6 and are held in place by the bayonet-joint in the manner set forth, so as to prevent displacement when the butter is subjected to pressure. The outer ends of the caps have openings of various forms, according to the desired shape or configuration of the prints or pads of butter to be served. Some of these forms are shown in Fig. 6, although other designs are contemplated. These molds or formers are of like size, so as to be interchangeably fitted upon the outer end or projecting portion of the cylinder, thereby enabling prints of any desired shape being formed.

The frame 5 comprises terminal feet 25 and an upper structure of box formation, the space formed between the end plates and the upper and lower plates 26 and 27 receiving the arm 17, plunger-rod 15, and pawl 21 in the manner set forth. The upper or head portion of the frame being in the form of a box-loop serves as a guide to receive the parts applied thereto and prevent vertical displacement thereof. A tubular guide 28 projects outwardly from the end of the support or box remote from the frame 5 and is formed with a base 29, which is apertured to receive the fastening by means of which the said guide is secured in place. A bow-frame 30 has one member extended, as shown at 31, and of a size to snugly fit within the guide 28 and held therein by means of a binding-screw 32 let into a threaded opening formed in a side of the said guide. The arms or members of the frame 30 support a wire 33, which is stretched between them and extends around the outer side of the frame and applied to a tightening device applied to the said frame. This tightening device consists of a thumb-operated windlass 34, journaled to the longitudinal member of the frame 30 and provided at its inner end with a ratchet-wheel 35 to coöperate with a spring pawl or detent 36, the outer end of the windlass having a thumb-knob to be grasped between the thumb and finger of the hand when it is required to tighten the wire 33. A short arm 37 has its outer end formed with a saw cut to receive the wire 33, and the long arm 31 is provided with an opening 38, through which the said wire passes, the end portions of the wire passing around the outside of the frame and having their extremities attached to the windlass 34, so as to wind thereon when subjecting the wire to the requisite degree of tension necessary to secure the best results. The wire 33 constitutes a cutter and is disposed so as to clear the outer end of the mold or former and cut that portion of the butter forced through the former or mold in the operation of the device.

The tubes 3 are filled with butter in any convenient way and are stored in the box 2 or other place until required for use. When forming the prints or pads, the cylinder is oscillated upon its pivotal connection with the support. When required, one of the tubes 3 is removed from the box and placed in position in the cylinder in the manner substantially as stated herein. Upon oscillating the cylinder the plunger is alternately actuated and moved forward a distance corresponding to the required thickness of the prints or pads of butter to be formed. When swinging the cylinder away from the box, the pawl 21 rides upon the teeth 20 of the plunger-rod and that portion of the butter expelled from the cylinder is removed by the cutter. When the cylinder is swung backward or toward the box, the plunger is advanced and forcibly expels the butter from the cylinder and through the former or mold, which gives the desired shape thereto. The apparatus is of a portable nature and can be placed horizontally upon a support or may rest upon the end of the box or be located in any convenient position. When arranged in a position other than horizontal, it will be necessary to remove the receptacle 2 from the box, and after the apparatus has cut the required number of prints it can be placed in a horizontal position in a convenient location and the receptacle 2 can be replaced within the box, so as to prevent the too-rapid heating of the cooling agent.

As shown in Fig. 2, the jacket 7' is a wooden box, the top being adapted to be opened, being preferred because it does not sweat, retains the cold longer than metal, and may be used for storage of the filled butter-tubes. A handle 39 is applied to a side of the jacket 7' for convenience of operation. The support 40 for the operating parts is a stand consisting of a base and feet. The working parts are substantially the same as herein described.

When the device is designed for cutting a number of prints at one time, the jacket for the cylinder is dispensed with, as shown in Fig. 3, the butter remaining sufficiently firm in the cylinder until formed into prints. This form does not differ materially from the others, the operating parts being mounted upon a stand 40 in substantially the same manner as shown in Fig. 2.

Having thus described the invention, what is claimed as new is—

1. In a device for molding and cutting butter or the like into prints or pads, a cylinder, a tube loosely and detachably fitted within the cylinder and containing the commodity to be formed into prints, a feeding mechanism for forcibly expelling the said commodity from the tube, and a molding cap or former having detachable and positive interlocking connection with the cylinder and having a portion to extend across the front end of the tube and hold the latter within the cylinder against the action of the feeding mechanism, substantially as set forth.

2. In a device of the character set forth, an oscillatory cylinder, a plunger adapted to operate within the cylinder and having a series of teeth along one side, means for engaging the teeth of the plunger-rod to advance the latter as the cylinder is oscillated, and adjusting means for changing the relation of the feed device to vary the movement thereof without altering the amplitude of movement of the cylinder, substantially as set forth.

3. In a device of the nature specified, an oscillatory cylinder, a plunger adapted to operate in said cylinder and provided with a rod toothed at one side, a pawl disposed for conjoint use with the toothed plunger-rod, and means for changing the relation of the pawl so as to vary the feed of the plunger without affecting the amplitude of movement of the cylinder, substantially as set forth.

4. In a device substantially as described, a cylinder, a tube removably inserted in the cylinder and having its terminal portions outwardly flared, and a plunger disposed to operate in the said tube and having an end portion beveled, substantially as set forth.

5. In a device of the nature specified, a cylinder, and feeding mechanism coöperating therewith, in combination with a guide, a frame of approximately bow form having an arm extended to be adjustably connected with said guide, a wire applied to the said frame, and means for subjecting the wire to tension, substantially as set forth.

In testimony whereof I affix my signature in presence of two witnesses.

LOUIS L. MIVELAZ. [L. S.]

Witnesses:
   C. P. ROBERTS,
   P. COPELLA.